United States Patent [19]
Iima et al.

[11] Patent Number: 5,825,403
[45] Date of Patent: Oct. 20, 1998

[54] OPTICAL SCANNING SYSTEM AND METHOD FOR SETTING CURVATURE OF FIELD THEREIN

[75] Inventors: Mitsunori Iima; Yoshihiro Hama, both of Tokyo, Japan

[73] Assignee: Asahi Kogaku Kogyo Kabushiki Kaisha, Tokyo, Japan

[21] Appl. No.: 620,304

[22] Filed: Mar. 22, 1996

[30] Foreign Application Priority Data

Mar. 24, 1995 [JP] Japan .................................... 7-091673

[51] Int. Cl.⁶ ...................................................... B41J 2/47
[52] U.S. Cl. ............................................................ 347/259
[58] Field of Search .................................... 347/259, 258, 347/256, 241, 244, 134

[56] References Cited

U.S. PATENT DOCUMENTS

| | | | |
|---|---|---|---|
| 4,941,719 | 7/1990 | Hisada et al. | 359/205 |
| 5,233,457 | 8/1993 | Hamada et al. | 347/259 |

*Primary Examiner*—Mark J. Reinhart
*Attorney, Agent, or Firm*—Greenblum & Bernstein, P.L.C.

[57] ABSTRACT

An optical scanning system in which light emitted from a light source is deflected by a deflector and converged onto a surface to be scanned by an optical image forming system. The optical image forming system has a curvature of field in a sub-scanning direction to cancel a change in a beam spot diameter caused by a change in an F-number in the sub-scanning direction, depending on an image height in the main scanning direction. The invention is also addressed to a method for determining a curvature of field in the optical scanning system.

11 Claims, 9 Drawing Sheets

Curvature of Field

Beam Diameter

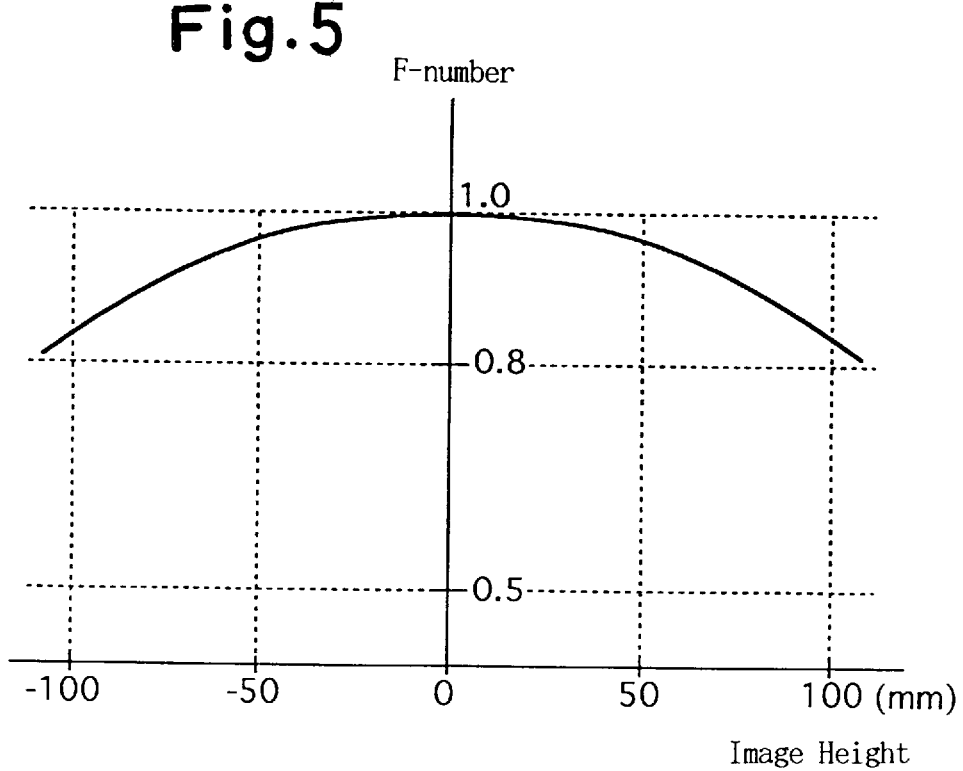

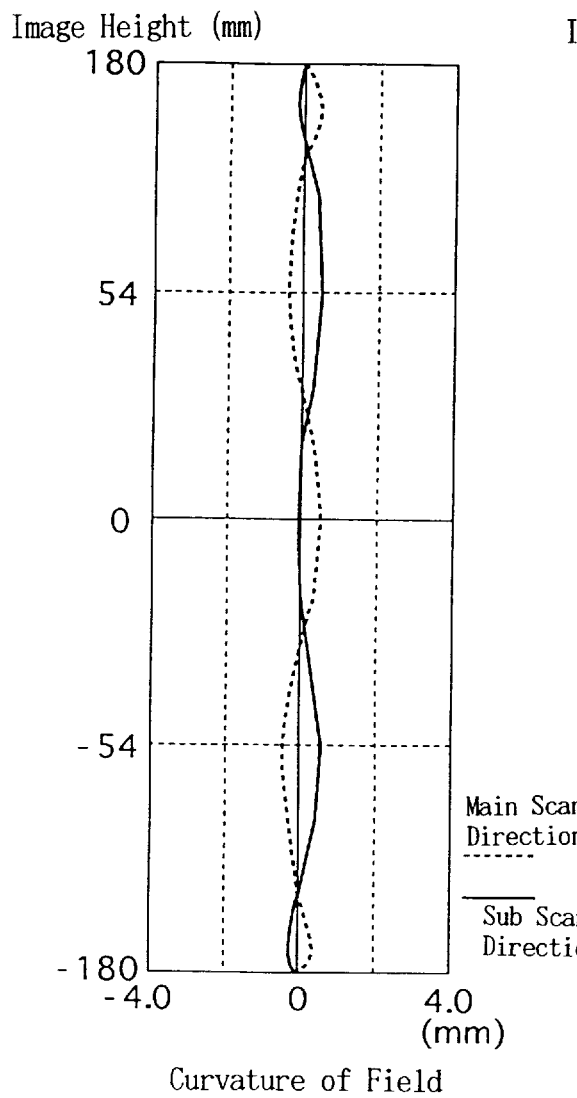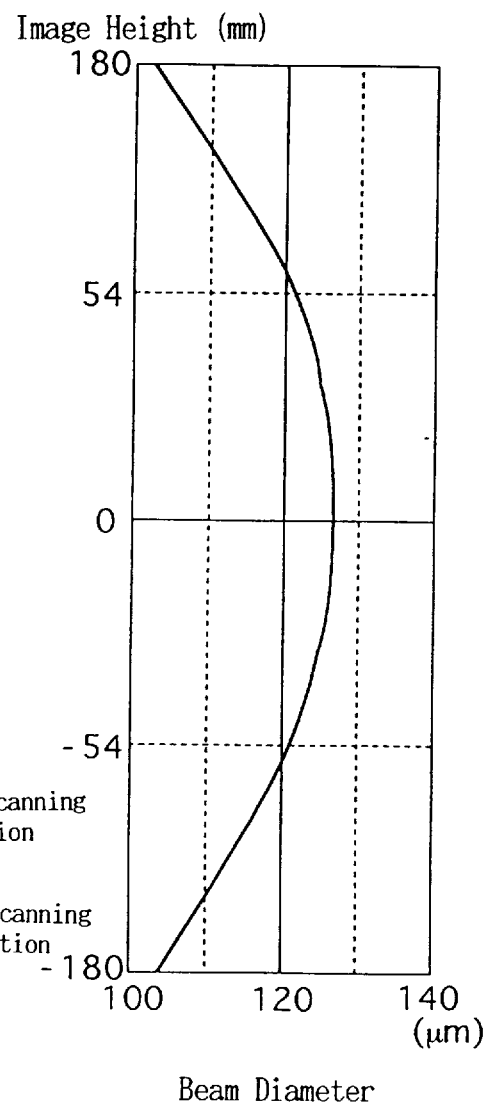
Fig. 6A Curvature of Field
Fig. 6B Beam Diameter

OPTICAL SCANNING SYSTEM AND METHOD FOR SETTING CURVATURE OF FIELD THEREIN

BACKGROUND OF THE INVENTION

1. Field of the Invention

The present invention relates to an optical scanning system used in an optical system of a laser printer or the like, and a method for setting a curvature of field in the optical scanning system.

2. Description of the Related Art

A known optical scanning system, incorporated in an optical system of a laser printer or the like, is comprised of a polygonal mirror and an f-θ lens. In such an optical scanning system, the curvature of field must be restricted to flatten the image surface (focal surface) in both a main scanning direction and a sub-scanning direction (normal to the main scanning direction).

In an optical scanning system, in the main scanning direction there is an inevitable difference in the length of the optical path, with respect to a surface (object) to be scanned, between light passing through a center portion and light passing through a peripheral portion. Due to this difference in the optical path length, it has been found that the F-number in the sub-scanning direction tends to vary during the main scanning. This variation in the F-number causes the beam diameter to alter. Consequently, even if the curvature of field is correctly compensated for, the beam diameter in the sub-scanning direction depends on the image height, thus resulting in an unstable printing efficiency.

Since the change in the F-number occurs due to a difference in magnification in the sub-scanning direction between the center portion and the peripheral portion in the main scanning direction, the above-mentioned problem is more serious in an optical system in which there is a large difference in the magnification in the sub-scanning direction.

SUMMARY OF THE INVENTION

It is an object of the present invention to provide an optical scanning system in which no or little change in the beam diameter in the sub-scanning direction occurs, even if there is a difference in the F-number in the sub-scanning direction between the center portion and the peripheral portion in the main scanning direction.

To achieve the object mentioned above, according to an aspect of the present invention, there is provided an optical scanning system in which light emitted from a light source is deflected by a deflector and converged onto a surface to be scanned by an optical image forming system, wherein the optical image forming system has a curvature of field in a sub-scanning direction to cancel a change in a beam spot diameter caused by a change in the F-number in the sub-scanning direction, depending on an image height in the main scanning direction.

The optical image forming system comprises a correcting lens which is located closest to a surface to be scanned, and whose shape is curved so that a peripheral portion of the correcting lens is located closer to the surface to be scanned than a center portion of the correcting lens in a main scanning direction.

The deflector is preferably arranged so as to reflect the light emitted from the light source and made incident upon the deflector at a first separation angle in the sub-scanning direction. The optical image forming system comprises of a curved mirror which has a positive power in the main scanning direction and is arranged so as to reflect the light reflected by the deflector at a second separation angle in the sub-scanning direction. An anamorphic lens is provided between the curved mirror and the surface to be scanned and has a power chiefly in the sub-scanning direction.

Preferably, at least one surface of the anamorphic lens has an optical axis which deviates from the optical axis of the optical scanning system in the sub-scanning direction.

In one embodiment, the anamorphic lens is curved so that the peripheral portion thereof is located closer to the surface to be scanned than the center portion of the anamorphic lens in the main scanning direction.

According to another aspect of the present invention, there is provided an optical scanning system in which light emitted from a light source is deflected by a deflector and converged onto a surface to be scanned. Means are provided for setting the curvature of field of the optical image forming system so that a beam spot diameter on the surface to be scanned is kept constant.

According to another aspect of the present invention, there is provided a method for setting a curvature of field in an optical scanning system in which light emitted from a light source is deflected by a deflector in a main scanning direction and converged onto a surface to be scanned by an optical image forming system. The method comprises the steps of obtaining an F-number in a sub-scanning direction (normal to the main scanning direction), at each image height on the surface to be scanned; determining a beam spot diameter based on the F-number thus obtained, at each image height, in accordance with a predetermined correlation between the beam diameter and the F-number; obtaining a difference in the beam diameter between on-axis light and off-axis light; determining the amount of defocus necessary to cancel the difference in the beam diameter, thus obtained, based on a predetermined correlation therebetween; and, providing curvature of field with the image forming optical system so that the defocus thus obtained is produced at each image height.

The present disclosure relates to subject matter contained in Japanese Patent Application No. HEI 7-91673 (filed on Mar. 24, 1995) which is expressly incorporated herein by reference in its entirety.

BRIEF DESCRIPTION OF THE DRAWINGS

The invention will be discussed below in detail with reference to the accompanying drawings, in which:

FIG. 5 is a graph showing a relationship between an F-number and an image height in a reference optical system, in which it is assumed that the on-axis F-number is 1.0;

FIGS. 6A and 6B are diagrams respectively showing the curvature of field and the beam spot diameter in relation to the image height, in the reference optical system;

DESCRIPTION OF THE PREFERRED EMBODIMENT

An embodiment of an optical scanning system according to the present invention, applied to a reflection type optical scanning system, will be discussed below.

Figure 1:
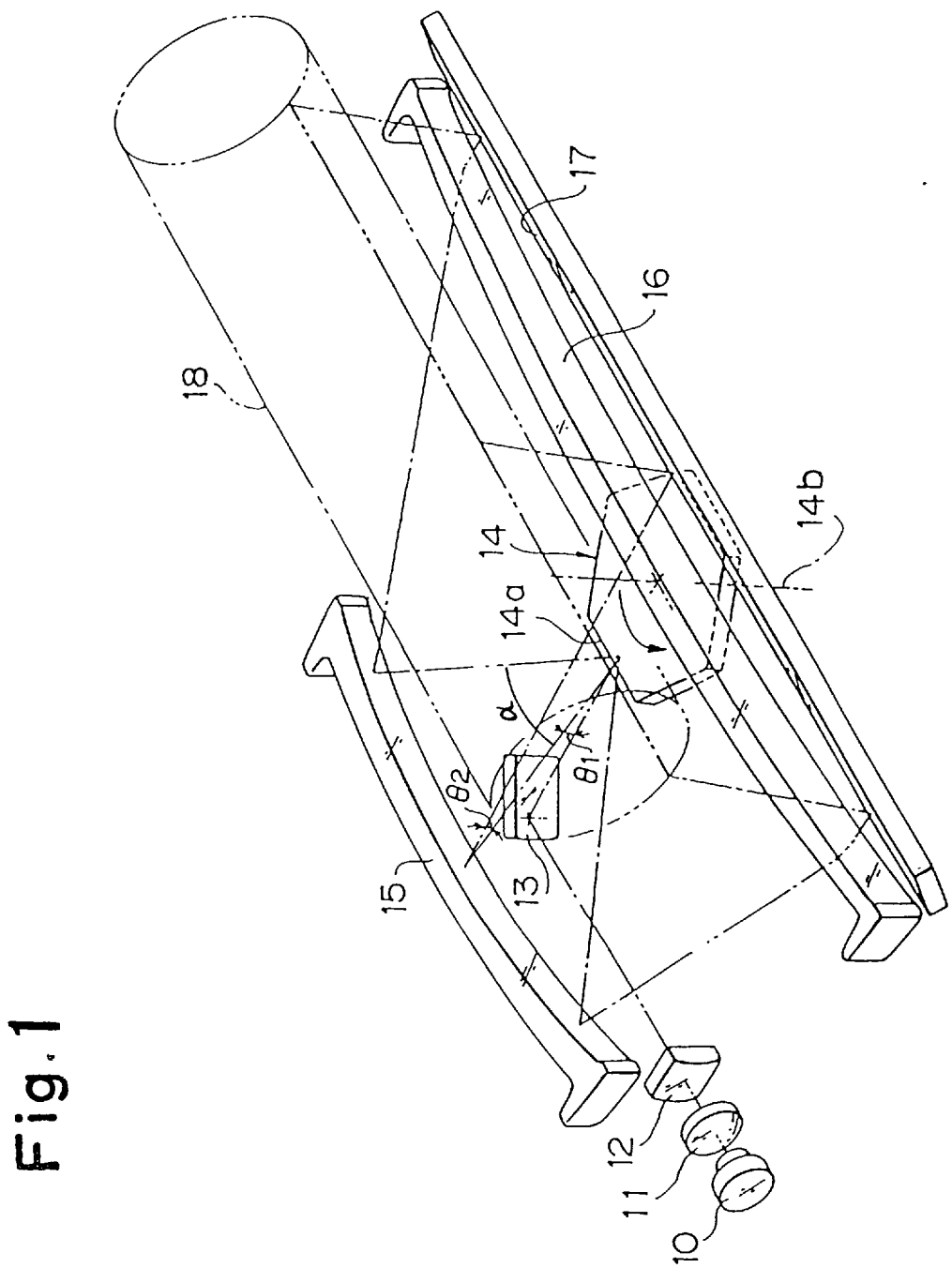
FIG. 1 is an explanatory view of an optical scanning system in the perspective view, according to the present invention.

In an optical scanning system shown in FIG. 1, divergent light emitted from a semiconductor laser 10 (used as a light source) is collimated by a collimating lens 11 and is made incident upon a polygonal mirror 14 through a cylindrical lens 12, which has a power only in the sub-scanning direction, and a planar mirror 13.

Laser light reflected and deflected at a first separation angle θ1 (FIG. 3) in the sub-scanning direction by a reflecting surface 14*a* of the polygonal mirror 14, is reflected at a second separation angle θ2 (FIG. 3) in the sub-scanning direction by a curved mirror 15 toward the polygonal mirror 14, and is transmitted through an anamorphic lens 16 which has a power mainly in a sub-scanning direction.

Figure 2:
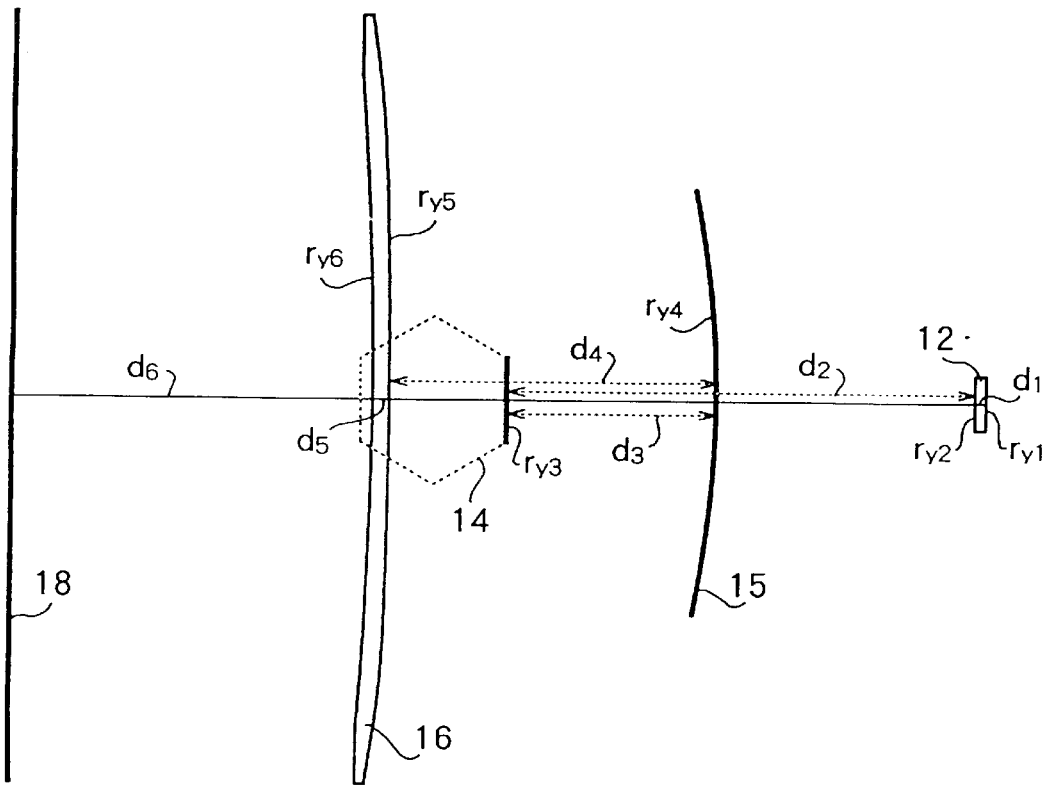
FIG. 2 is an explanatory view of the optical scanning system shown in FIG. 1, in which a light path is partially developed in the main scanning direction.
Figure 11:
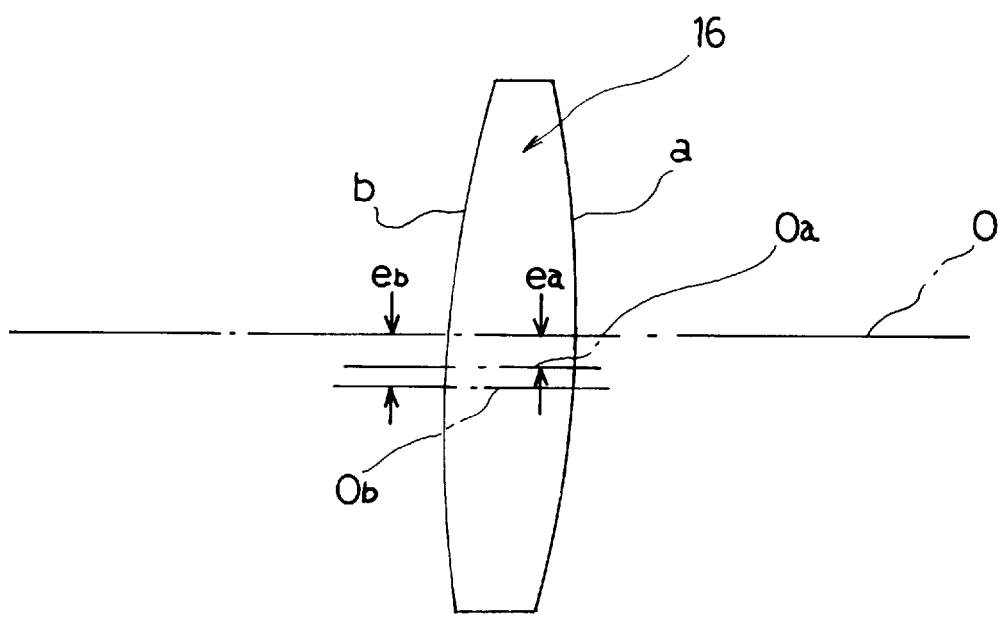

The curved mirror 15 is made of an aspherical surface having a rotational symmetry with respect to an optical axis O of the optical scanning system (see FIG. 11). The curved mirror 15 and the anamorphic lens 16 constitute an optical image forming system. The optical axis O of the optical scanning system is defined as an optical path of the light reflected by the planar mirror 13, reflected by the reflecting surface of the polygonal mirror 14 perpendicular thereto and made incident upon the mirror 15 and the anamorphic lens 16 at the centers thereof in the longitudinal directions of the mirror 15 and anamorphic lens 16, as can be seen in FIG. 2.

Figure 3:
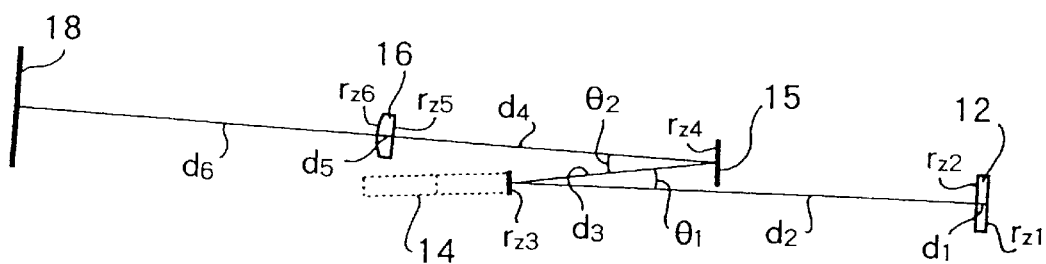
FIG. 3 is an explanatory view of the optical scanning system shown in FIG. 1, in which the light path is partially developed in the sub-scanning direction.

The laser light transmitted through the anamorphic lens 16 is reflected by an optical path changing mirror 17 (FIG. 1), so that a beam spot is formed on a photosensitive drum 18 (object to be scanned). The beam spot is moved in the main scanning direction, identical to the direction of the generatrix of the photosensitive drum 18, to scan the beam spot in the main scanning direction. In FIGS. 2 and 3, the planar mirror 13 and the optical path changing mirror 17 are omitted.

The laser light is converged once at a position in the vicinity of the reflecting surface 14*a* of the polygonal mirror 14 by the cylindrical lens 12 in the sub-scanning direction, and is then converged again onto the photosensitive drum 18, mainly due to the power of the anamorphic lens 16.

The first separation angle θ1 is selected to be as small as possible, provided that the laser light reflected by the polygonal mirror 14 toward the curved mirror 15 does not interfere with the planar mirror 13. Similarly, the second separation angle θ2 is selected to be as small as possible, provided that the laser light reflected by the curved mirror 15 does not interfere with the polygonal mirror 14. It should be noted that the polygonal mirror 14 rotates about an axis 14*b*, and that between the polygonal mirror 14 and the anamorphic lens 16 there is a space large enough to prevent oscillation, due to the rotation of the polygonal mirror 14, from being transmitted to the anamorphic lens 16.

The incident surface of the anamorphic lens 16, on the incident side, is an aspherical surface having rotational symmetry with respect to the optical axis O. The emission surface thereof, on the emission side, is a curved surface, which is obtained by rotating a non-arc about an axis parallel to the main scanning direction, and which is not rotationally-symmetric with respect to the optical axis O. The anamorphic lens 16 has substantially no power at a center portion thereof, and the incident surface is convex toward the incident side at the peripheral portion, and the emission surface is concave toward the emission side at the peripheral portion.

Incident surface "a" and emission surface "b" of the anamorphic lens 16 are located so that an optical axes Oa and Ob of the end surfaces are respectively deviated from the optical axis O of the optical scanning system by deviations "ea" and "eb" towards the polygonal mirror 14 in the sub-scanning direction, as shown in FIG. 11. Note that for the purpose of explanation, the deviations are exaggerated in FIG. 11.

The deviation of the surfaces of the anamorphic lens 16 in the sub-scanning direction, as mentioned above, contributes to a restriction of the curvature of the scanning beam, caused when the laser light is incident upon the reflecting surface of the polygonal mirror 14 at a certain angle in the sub-scanning direction.

The anamorphic lens 16 is adapted not only to correct the curvature of field in the main scanning direction, but also to appropriately set the curvature of field in the sub-scanning direction. In the optical scanning system, the distance between the reflecting surface 14*a* of the polygonal mirror 14 and the curved mirror 15, and the first separation angle θ1, are preferably selected to be minimum values to realize a compact optical system, and hence, the degree of freedom in design of the surface shape of the curved mirror 15 is restricted to some extent so as not to interfere with the light incident upon the polygonal mirror 14.

The reduced degree of freedom in design of the surface shape of the curved mirror 15 leads to a restriction in the correction of the aberrations by the curved mirror 15. Consequently, the curvature of field must be compensated chiefly by the anamorphic lens 16.

Thus, it is necessary for the anamorphic lens 16 to prevent the curvature of the scanning line (bow) and correct the curvature of field. To this end, it is preferable that the shape of the anamorphic lens 16 be curved so that the peripheral portion thereof is closer to the object (surface) to be scanned than the center portion of the anamorphic lens 16, along the main scanning direction. In general, if the anamorphic lens 16 is shaped as mentioned above, the difference of magnification in the sub-scanning direction between the peripheral portion and the center portion in the main scanning direction increases. This results in a large variation in the F-number in the sub-scanning direction.

In the case that the F-number at the peripheral portion is smaller than that at the center portion (i.e., on the axis), if there is no curvature of field, and the whole surface to be scanned is located at the position in which the defocus amount is zero, the beam spot diameter at the center portion is larger than that at the peripheral portion. To solve this, in the optical scanner according to the illustrated embodiment of the present invention, the anamorphic lens 16 has a curvature of field in the sub-scanning direction to restrict the change in a diameter of the beam spot, caused by the change in the F-number. Numerical data of the illustrated embodiment is shown in Table 1 below. Note that in the following tables, "K" designates the scanning coefficient, "W" the scanning width, "ry" the radius of curvature in the main scanning direction, "rz" the radius of curvature in the sub-scanning direction, "d" the axial distance between the lens surfaces, and "n" the refractive index. The surface Nos. 1 and 2 represent the cylindrical lens 12, No. 4 represents the curved mirror 15, and, Nos. 5 and 6 represent the anamorphic lens 16 (see FIG. 3).

TABLE 1

K = 135.5 W = 216

| Surface No. | ry | rz | d | n |
|---|---|---|---|---|
| 1 | ∞ | 55.424 | 2.00 | 1.48617 |
| 2 | ∞ | ∞ | 113.00 | |
| 3 | | | 50.00 | |
| 4 | −258.624 | rotational symmetry | 77.90 | |
| 5 | −2919.870 | rotational symmetry | 4.00 | 1.48617 |
| 6 | 675.893 | −19.366 | | | first separation angle θ 1: 8.0°
second separation angle θ 2: 10.0°
eccentric amount of anamorphic lens (fifth surface) ea: −0.326 mm
eccentric amount of anamorphic lens (sixth surface) eb: −1.986 mm Note that the reflecting surface (fourth surface) of the curved mirror 15 and the incident surface (fifth surface) of the anamorphic lens 16 are aspherical surfaces. The emission surface (sixth surface) of the anamorphic lens 16 is the curved surface formed by rotating a non-arc in the main scanning direction around the axis parallel to the main scanning direction. The aspherical surface (and non-arc) is represented by the following equation:

$$X=CY^2/\{1+[(1-(1+K)C^2Y^2]^{1/2}\}+A4Y^4+A6Y^6+A8Y^8$$

wherein "X" designates the distance of the coordinates on the aspherical surface, at which the image height from the optical axis is "Y", from a tangential plane to the aspherical surface at the apex thereof, "C" the curvature (1/r) at the apex of the aspherical surface, "K" the constant of the cone, and, "A4", "A6", and "A8" the 4th-order, 6th-order and 8th-order aspherical surface factors, respectively. The radii of curvature of the aspherical surfaces in Table 1 are those at the apexes of the aspherical surfaces, and the constant of the cone and the aspherical surface factor of each aspherical surface are shown in Table 2.

TABLE 2

| | fourth surface | fifth surface | sixth surface |
|---|---|---|---|
| K | 5.980 | −0.033 | 0.769 |
| A4 | $1.369 \times 10^{-7}$ | $1.157 \times 10^{-7}$ | $-8.094 \times 10^{-7}$ |
| A6 | $-9.441 \times 10^{-12}$ | $-2.515 \times 10^{-12}$ | $6.832 \times 10^{-12}$ |
| A8 | $1.045 \times 10^{-15}$ | $-1.125 \times 10^{-16}$ | $-3.495 \times 10^{-16}$ |

Figure 4A:
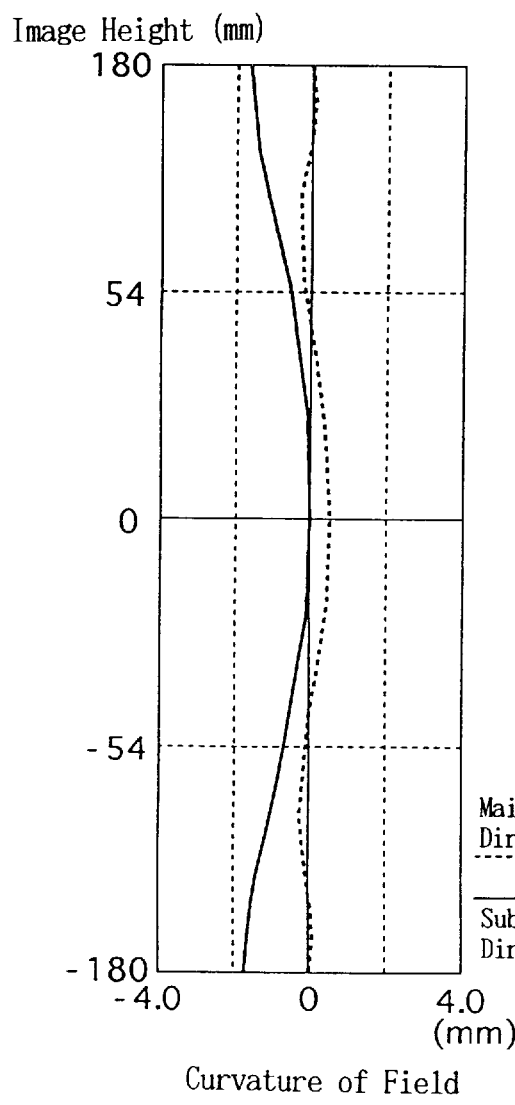
FIGS. 4A and 4B are diagrams respectively showing a curvature of field and a beam spot diameter in conjunction with an image height, according to the present invention.
Figure 4B:
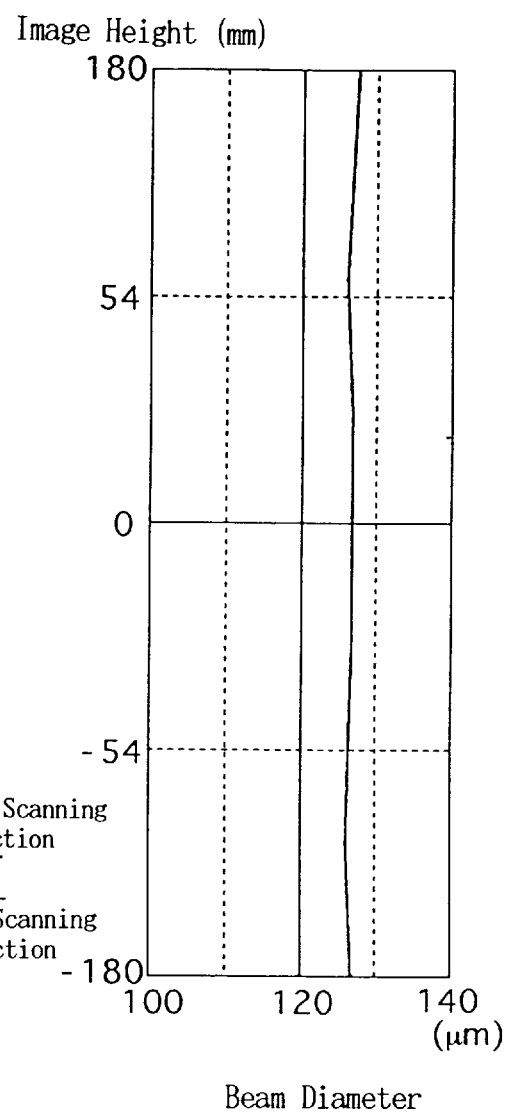

FIG. 4A shows the curvature of field in the optical scanning system according to the above-mentioned embodiment. The phantom line corresponds to the main scanning direction, and the solid line corresponds to the sub-scanning direction. As can be seen in FIG. 4A, the under-curvature of field occurs in the sub-scanning direction. Due to the curvature of field, the image is defocused at a high image height, so that the beam diameter at the high image height is increased in comparison with the beam diameter when there is no curvature of field. Thus, the change in the beam diameter due to the change in the F-number can be negated. Consequently, the change in the beam diameter can be restricted as shown in FIG. 4B. Note that the beam diameter is smallest when there is no defocus and increases as the defocus amount increases.

As can be understood from the above discussion, the change in the beam diameter due to the change in the F-number can be negated by the curvature of field, and accordingly, the beam diameter in the sub-scanning direction on the photosensitive drum 18 in the sub-scanning direction can be maintained at a substantially constant value throughout the width of the photosensitive drum 18 in the main scanning direction.

A method for determining or setting the curvature of field of the optical scanning system in the sub-scanning direction will be discussed below. Reference numerical data is shown in Tables 3 and 4 to correct the curvature of field in an optical scanning system (reference scanning system) as constructed above (using the conventional method).

TABLE 3

K = 135.5 W = 216

| Surface No. | ry | rz | d | n |
|---|---|---|---|---|
| 1 | ∞ | 55.424 | 2.00 | 1.48617 |
| 2 | ∞ | ∞ | 113.00 | |
| 3 | | | 50.00 | |
| 4 | −259.884 | rotational symmetry | 77.90 | |
| 5 | 5000.000 | rotational symmetry | 4.00 | 1.48617 |
| 6 | 544.306 | −19.686 | 51.42 | | first separation angle θ 1: 8.0°
second separation angle θ 2: 10.0°
eccentric amount of anamorphic lens (ea = eb): −2.08 mm

TABLE 4

| | fourth surface | fifth surface | sixth surface |
|---|---|---|---|
| K | 6.00 | 0.00 | 0.00 |
| A4 | $1.30 \times 10^{-7}$ | $5.62 \times 10^{-8}$ | $-1.17 \times 10^{-7}$ |
| A6 | $-5.50 \times 10^{-12}$ | $4.02 \times 10^{-12}$ | $8.63 \times 10^{-12}$ |
| A8 | $1.96 \times 10^{-16}$ | $-1.59 \times 10^{-16}$ | $-9.10 \times 10^{-17}$ |

The change in the F-number depending on the image height in the reference optical system is shown in FIG. 5, assuming that the F-number on the optical axis is 1.0. It can be seen that the F-number decreases as the image height increases. The curvature of field in the reference optical system in relation to the image height is shown in FIG. 6A, and the beam diameter changes in relation to the image height is shown in FIG. 6B.

In order to restrict the change in the beam diameter on the scanning surface, an amount of defocus to be provided is determined for the F-number at each image height, with reference to the F-number on the optical axis, to make the beam diameter of the off-axis light identical to the beam diameter of the on-axis light. Consequently, the curvature of field having a defocus distribution thus obtained is provided.

Figure 7:
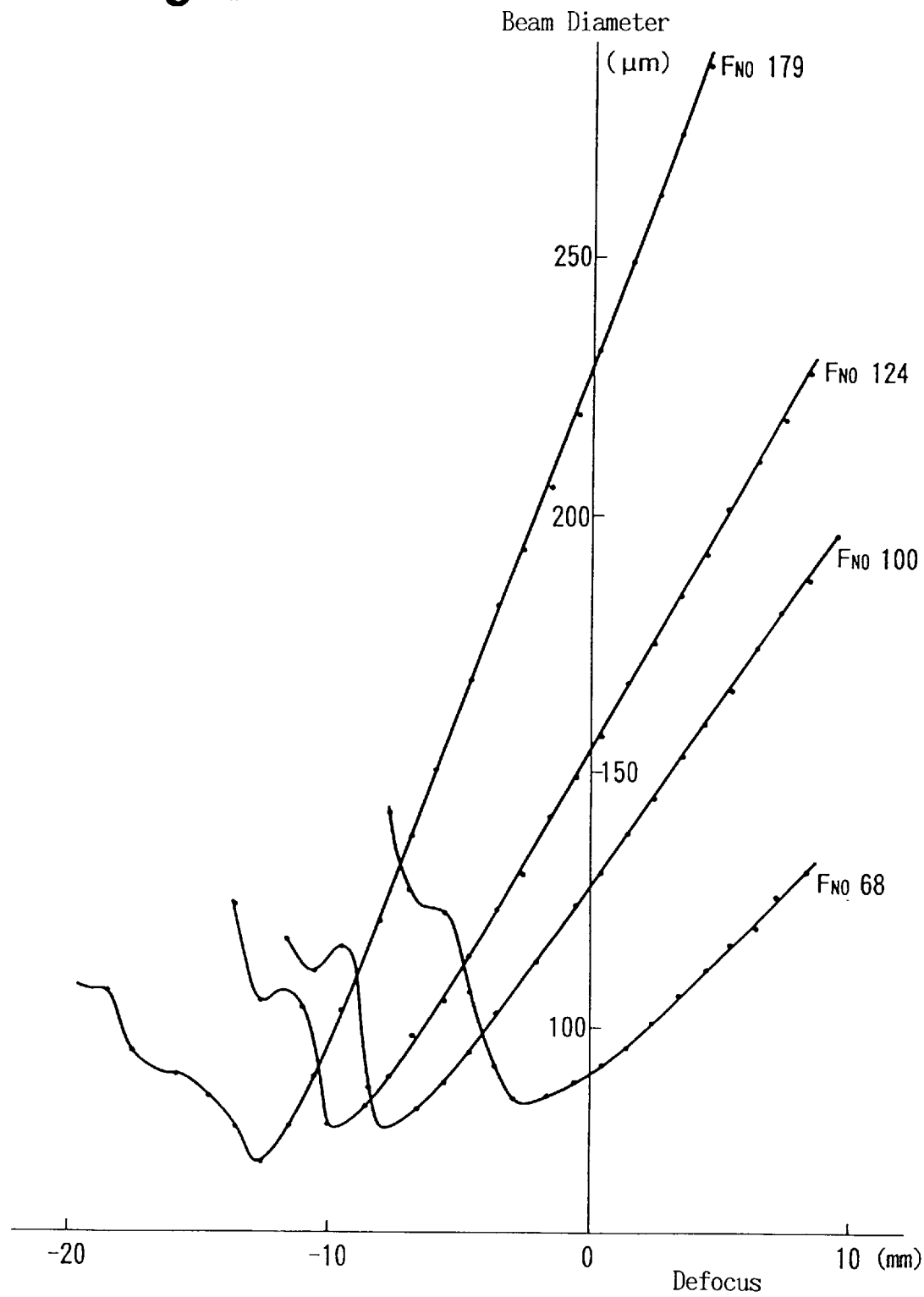
FIG. 7 is a graph showing a relationship between amounts of defocus (defocus amount) and beam diameters when the F-number of the on-axis light varies in the reference optical system.

The ratio of the change of the beam diameter to the defocus amount varies depending on the F-number in the sub-scanning direction. FIG. 7 shows examples of a relationship between the defocus amount and the beam diameter when the F-number of the on-axis light varies in the reference optical scanning system.

As can be seen in FIG. 7, when the F-number changes, not only does the beam diameter relative to the defocus amount vary, but also the position of the beam waist varies. It can be understood that in a reflection type optical scanning system having a toric lens (anamorphic lens), as in the illustrated embodiment of the present invention or the reference optical scanning system mentioned above, the change in the beam diameter in connection with the defocus amount is not symmetrical with respect to the position of the beam waist due to diffraction. In particular, when the defocus changes in the minus direction (negative direction) with respect to the position of the beam waist, the beam diameter increases remarkably.

Under these circumstances, upon determining the position of the surface to be scanned of the reflection type optical scanner, it is desirable that the surface to be scanned be positioned on the plus side with respect to the beam waist, to prevent the beam diameter from being suddenly varied even if the defocus amount or F-number changes due to the curvature of field. In FIG. 7, the F-number of the on-axis light is 100, and it is preferable that the surface to be scanned be located at a position at which the defocus amount is zero.

Figure 8:
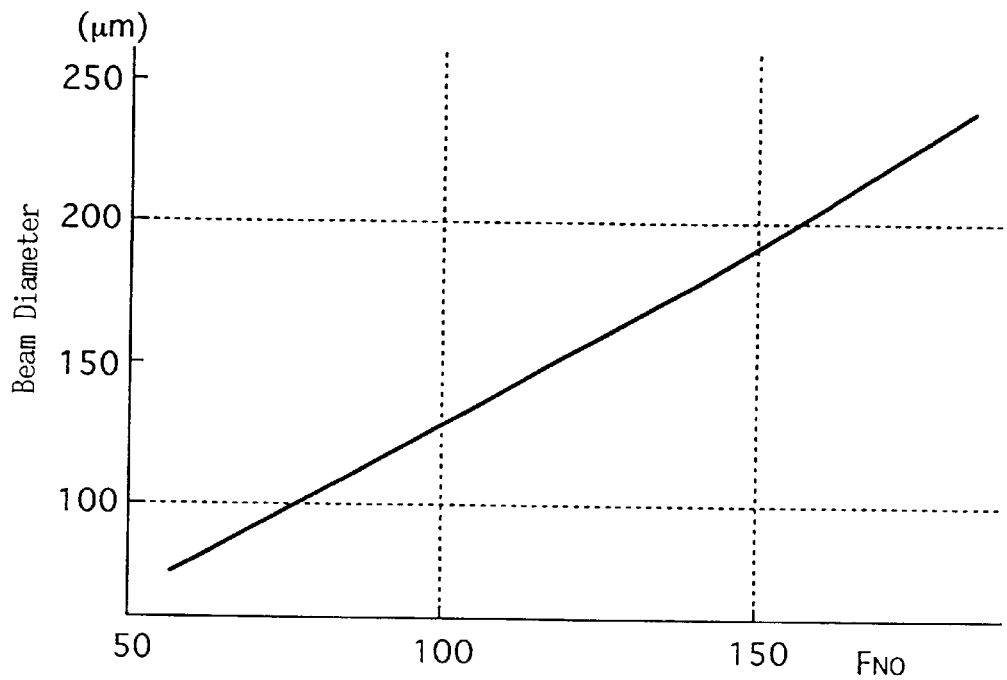
FIG. 8 is a graph showing a relationship between a beam spot diameter and an F-number.
Figure 9:
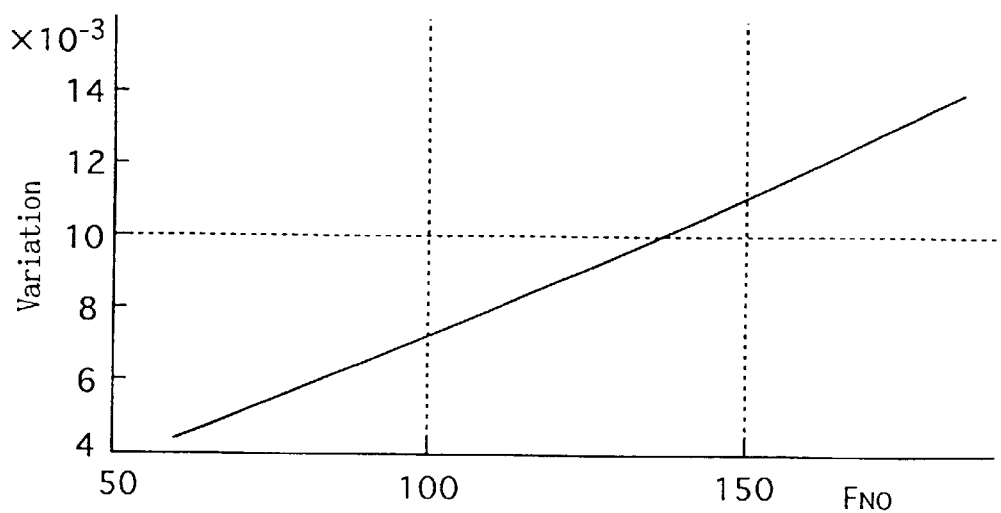
FIG. 9 is a graph showing a relationship between a beam spot diameter and a unit defocus amount in the sub-scanning direction.

The change in the beam diameter in connection with the change of the F-number on the surface to be scanned, located at a position in which the defocus amount is zero, is represented by an approximately linear relation, as shown in FIG. 8. Thus, it can be found that the ratio of the change of the beam diameter in the sub-scanning direction to a change of a unit defocus amount, i.e., the beam diameter variation is correlative to the F-number as shown in FIG. 9.

In order to obtain the curvature of field to restrict the change in the beam diameter, based on the correlation between the beam diameter variation and the F-number, the F-number in the sub-scanning direction at each image height is obtained, the beam spot diameter is then obtained based on the F-number in accordance with the correlation shown in FIG. 8, and, thereafter the difference in the spot diameter between the on-axis light and the off-axis light at each image height is obtained. Thereafter, the defocus amount necessary to eliminate the difference in the spot diameter is obtained in accordance with the correlation shown in FIG. 9. After that, the curvature of field is provided to the optical image forming system (anamorphic lens) 16, so that the defocus obtained is produced at each image height to restrict the change in the beam diameter due to the change in the F-number.

Table 5 below shows numerical data (experimental results) of the beam spot diameter and the variation when it is assumed that the F-number of the on-axis light (y=0) is 100. The F-number, the beam spot diameter, the variation, the difference in the spot diameter between the on-axis light and the off-axis light, and the defocus amount, cancel the difference in the spot diameter, at an intermediate image height (y=80 mm) and at the maximum image height (y=108 mm), respectively, in the reference optical scanner.

TABLE 5

| image height | F-number | beam diameter | variation | difference in spot diameter | defocus amount |
|---|---|---|---|---|---|
| y = 0 | 100 | 127 $\mu$m | 7.2 × 10$^{-3}$ | 0 $\mu$m | 0 mm |
| y = 80 | 91 | 117 $\mu$m | 6.6 × 10$^{-3}$ | −10 $\mu$m | −1.5 mm |
| y = 108 | 81 | 105 $\mu$m | 5.9 × 10$^{-3}$ | −22 $\mu$m | −1.7 mm |

As can be seen in Table 5, assuming that the F-number of the on-axis light in the sub-scanning direction is 100, the beam diameter can be made identical by providing a curvature of under-field of −1.5 mm and −1.7 mm, at the intermediate image height (y=80 mm) and the maximum image height (y=108 mm), respectively. In the illustrated embodiment of the present invention, the reference optical scanner is modified so as to produce the curvature of field in accordance with the numerical data shown in Table 5.

Figure 10:
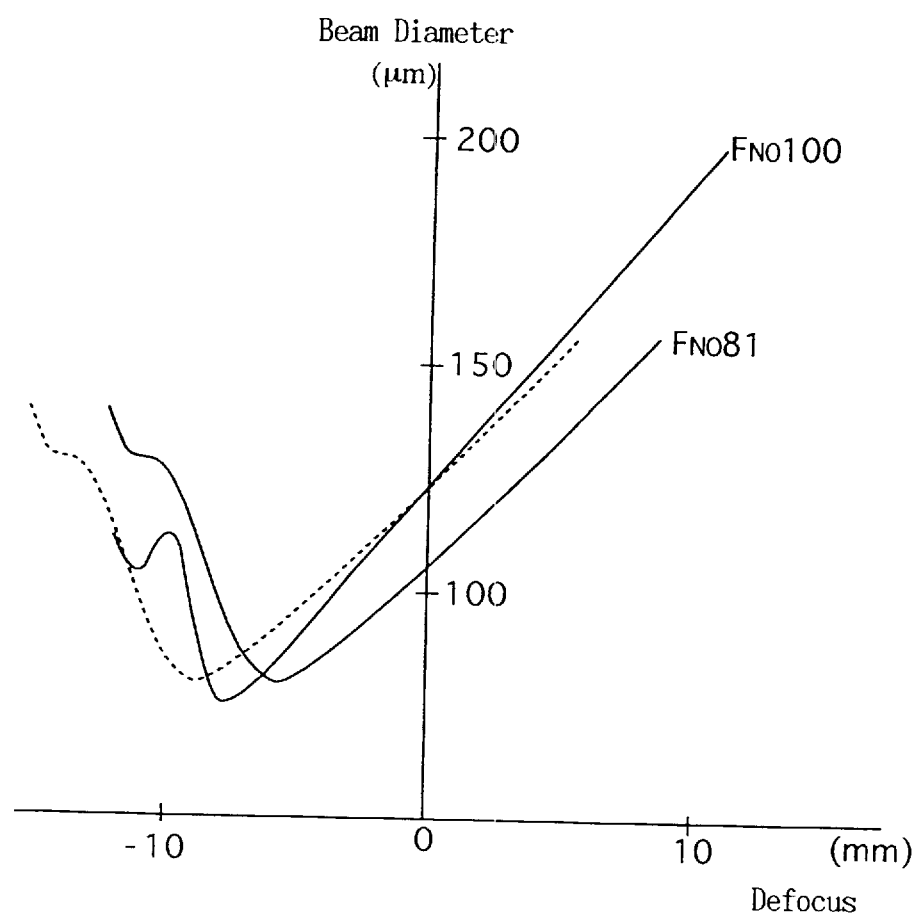
FIG. 10 is a graph showing a relationship between the on-axis light whose F-number is 100 and the defocus amount of light whose F-number is 81 at a maximum image height; and, FIG. 11 is an explanatory view showing a deviation of an anamorphic lens.

FIG. 10 shows a relationship between the defocus and the beam diameter of the on-axis light (F-number =100) and the off-axis light at the maximum image height (F-number=81). If the curvature of under-field is provided, the beam diameter is adjusted as if the characteristic curve of the F-number being 81, indicated by a solid line, is shifted to a position indicated by a phantom line.

The defocus is determined in accordance with data shown in FIG. 7 which shows a relationship between the F-number of the on-axis light (f=0) and the change in the beam diameter due to the defocus, as mentioned above. The off-axis light has an angle α (FIG. 1) with respect to the optical axis within the main scanning plane. Therefore, it is possible to obtain more precise data using a graph prepared for each representative image height, wherein the values of the abscissa of each graph are divided and scaled by cosine θ in accordance with the image height.

Since the data, such as, the beam diameter corresponding to the F-number, the variation, the displacement of the image surface, etc., varies depending on the structure of the optical system, the analysis data is appropriately selected in accordance with the optical system.

As can be understood from the foregoing, according to the present invention, the change in the beam diameter due to the change in the F-number in the sub-scanning direction during the scanning operation can be negated by the curvature of field (field curvature). Thus, the change in the beam diameter in the sub-scanning direction on the surface to be scanned can be restricted, thus resulting in a stable printing or drawing efficiency.

What is claimed is:

1. An optical scanning system, comprising:
    a light source;
    a deflector that deflects and scans light emitted from said light source in a main scanning direction; and
    an optical image forming system that converges light deflected by said deflector onto a surface to be scanned, wherein said optical image forming system includes a curvature of field in a sub-scanning direction, normal to said main scanning direction, to cancel a change in a beam spot diameter caused by a change in an F-number in said sub-scanning direction, depending on an image height in said main scanning direction.

2. The optical scanning system according to claim 1, wherein said optical image forming system comprises a correcting lens located closest to a surface to be scanned, said correcting lens having a curved shape so that a peripheral portion thereof is located closer to said surface to be scanned than a center portion thereof in said main scanning direction.

3. The optical scanning system according to claim 1, wherein said deflector is arranged so as to reflect said light emitted from said light source and made incident upon said deflector, at a first separation angle in said sub-scanning direction, and
    wherein said optical image forming system comprises a curved mirror having a positive power in said main scanning direction arranged so as to reflect light, reflected by said deflector, at a second separation angle in said sub-scanning direction, and an anamorphic lens provided between said curved mirror and said surface to be scanned, said anamorphic lens having a power mainly in said sub-scanning direction.

4. The optical scanning system according to claim 3, wherein at least one surface of said anamorphic lens has an optical axis that deviates from said optical axis of said optical scanning system in said sub-scanning direction.

5. The optical scanning system according to claim 3, wherein said anamorphic lens is curved so that a peripheral portion thereof is located closer to said surface to be scanned than a center portion in said main scanning direction.

6. A method for setting a curvature of field in an optical scanning system in which light emitted from a light source is deflected and scanned by a deflector in a main scanning direction and converged onto a surface to be scanned by an optical image forming system, comprising:

obtaining an F-number in a sub-scanning direction normal to the main scanning direction, at each image height on the surface to be scanned;

determining a beam spot diameter based on the obtained F-number, at each image height, in accordance with a predetermined correlation between the beam spot diameter and the F-number;

obtaining a difference in the beam spot diameter between on-axis light and off-axis light;

determining an amount of defocus necessary to cancel the difference in the obtained beam spot diameter, based on a predetermined correlation therebetween; and providing a curvature of field with the optical image forming system so that the defocus amount thus obtained is produced at each image height.

7. The optical scanning system of claim 1, wherein said optical image forming system comprises an aspherical curved mirror and an aspherical anamorphic lens.

8. An optical scanning system, comprising:

a light source;

a deflector that deflects and scans light emitted from said light source in a main scanning direction;

an aspherical curved mirror having a rotational symmetry with respect to an optical axis of said optical forming system that receives said light source emitted by said deflector in said main scanning direction; and an anamorphic lens having a power mainly in a sub-scanning direction to cancel a change in a beam spot diameter caused by a change in an F-number in said sub-scanning direction, based upon an image height in said main scanning direction, said aspherical curved mirror and said anamorphic lens converging light deflected by said deflector onto a surface to be scanned.

9. The optical scanning system of claim 8, wherein said deflector is arranged to reflect said light emitted from said light source and made incident upon said deflector, at a first separation angle in said sub-scanning direction.

10. The optical scanning system of claim 8, wherein said aspherical curved mirror has a positive power in said main scanning direction to reflect light, reflected by said deflector, at a second separation angle in said sub-scanning direction.

11. The optical scanning system of claim 8, wherein said anamorphic lens is positioned between said aspherical curved mirror and said surface to be scanned.

* * * * *